United States Patent
Tsujimura et al.

(10) Patent No.: US 9,444,082 B2
(45) Date of Patent: Sep. 13, 2016

(54) BATTERY PACK STRUCTURE FOR ELECTRIC VEHICLES

(75) Inventors: Norihisa Tsujimura, Sagamihara (JP); Toshifumi Takamatsu, Sagamihara (JP); Makoto Iwasa, Chigasaki (JP); Takeshi Onodera, Machida (JP); Tatsunori Tanigaki, Yamato (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/117,481

(22) PCT Filed: Mar. 1, 2012

(86) PCT No.: PCT/JP2012/055201
§ 371 (c)(1),
(2), (4) Date: Nov. 13, 2013

(87) PCT Pub. No.: WO2012/157315
PCT Pub. Date: Nov. 22, 2012

(65) Prior Publication Data
US 2015/0136504 A1    May 21, 2015

(30) Foreign Application Priority Data

May 17, 2011   (JP) .................................. 2011-110193

(51) Int. Cl.
*B60K 1/00* (2006.01)
*B60R 16/04* (2006.01)
(Continued)

(52) U.S. Cl.
CPC .............. *H01M 2/1077* (2013.01); *B60K 1/04* (2013.01); *B60L 1/003* (2013.01); *B60L 1/02* (2013.01);
(Continued)

(58) Field of Classification Search
CPC ........... B60R 16/04; B60K 1/00; B60L 3/02; B60L 3/04

USPC ........................................ 180/68.5, 65.1, 283
See application file for complete search history.

(56) References Cited

U.S. PATENT DOCUMENTS 5,534,364 A * 7/1996 Watanabe et al. .............. 429/61
6,188,574 B1   2/2001 Anazawa
(Continued)

FOREIGN PATENT DOCUMENTS

JP   7-156826 A    6/1995
JP   7-212903 A    8/1995
(Continued)

OTHER PUBLICATIONS

European Extended Search Report, Jan. 8, 2015, 6 pages.
(Continued)

*Primary Examiner* — Bryan Evans
(74) *Attorney, Agent, or Firm* — Foley & Lardner LLP (57) ABSTRACT

An object of the present invention is to secure both of vehicle body floor upper space and battery mounting space, in setting of a mounting position of a high-power cut-off switch to a battery pack case. Battery pack case 1 having battery modules 2 and SD switch 4 that cuts off battery high-power circuit by manual operation is arranged in a lower position of vehicle body floor 100. In this battery pack structure for electric vehicle, an inside space of the battery pack case 1 is divided into two areas in a vehicle front-and-rear direction, and one of the two areas is defined as a battery module mounting area 7. SD switch 4 is provided in an upper surface position of the case that covers an electrical component mounting area 8, which is the other area, located on a vehicle front side with respect to battery module mounting area 7.

6 Claims, 7 Drawing Sheets

(51) Int. Cl.
*B60L 3/02* (2006.01)
*B60L 3/04* (2006.01)
*H01M 2/10* (2006.01)
*B60K 1/04* (2006.01)
*B60L 1/00* (2006.01)
*B60L 1/02* (2006.01)
*B60L 11/18* (2006.01)
*H01M 2/34* (2006.01)
*H01M 10/625* (2014.01)
*H01M 10/663* (2014.01)
*H01M 10/6563* (2014.01)

(52) U.S. Cl.
CPC .............. *B60L 3/04* (2013.01); *B60L 11/1803* (2013.01); *B60L 11/185* (2013.01); *B60L 11/1864* (2013.01); *B60L 11/1874* (2013.01); *B60L 11/1875* (2013.01); *B60L 11/1877* (2013.01); *B60L 11/1879* (2013.01); *H01M 2/1083* (2013.01); *H01M 2/34* (2013.01); *B60K 2001/0438* (2013.01); *B60L 2210/10* (2013.01); *B60L 2210/30* (2013.01); *B60L 2240/34* (2013.01); *B60L 2240/545* (2013.01); *H01M 10/625* (2015.04); *H01M 10/6563* (2015.04); *H01M 10/663* (2015.04); *H01M 2220/20* (2013.01); *Y02T 10/7005* (2013.01); *Y02T 10/7061* (2013.01); *Y02T 10/7072* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(56) References Cited

U.S. PATENT DOCUMENTS 8,561,743 B2 10/2013 Iwasa et al.
2011/0297467 A1* 12/2011 Iwasa et al. ............... 180/65.31

FOREIGN PATENT DOCUMENTS

| JP | 9-104239 A | 4/1997 |
| JP | 10-116370 A | 5/1998 |
| JP | 11-180164 A | 7/1999 |
| JP | 2004-142593 A | 5/2004 |
| JP | 2004-159378 A | 6/2004 |
| JP | 2006-240502 A | 9/2006 |
| WO | WO 2010/098271 A1 | 9/2010 |

OTHER PUBLICATIONS

Japanese Office Action, Feb. 3, 2015, 3 pages.

* cited by examiner

Air flow

FIG. 6

ENLARGED VIEW OF PART A

BATTERY PACK STRUCTURE FOR ELECTRIC VEHICLES

TECHNICAL FIELD

The present invention relates to a battery pack structure for an electric vehicle that mounts, in a lower position of a vehicle body floor, a battery pack having a battery module and a high-power cut-off switch.

BACKGROUND ART

In a related art, a battery pack structure in which a high-power cut-off switch (a breaker box 30) is mounted on an upper surface of a battery case (a battery box 28), in an electric vehicle that mounts in a lower position of a vehicle body floor a battery pack (battery modules A), has been known (see e.g. Patent Document 1).

Further, a battery pack structure in which a high-power cut-off switch (a switch unit 44) is provided with the high-power cut-off switch (the switch unit 44) arranged parallel to a battery module (a sub-module 24) in a vehicle width direction, in an electric vehicle that mounts in a trunk room (a luggage boot) a battery pack (a vehicle power supply unit 10), has been known (see e.g. Patent Document 2).

In the case of the battery pack structure disclosed in the Patent Document 1, however, since the high-power cut-off switch is mounted in an upper surface position of a battery module mounting area of the battery case, a height of the battery case becomes higher than a total height of the battery module and the high-power cut-off switch. Thus, in order to secure a necessary ground clearance from a road surface to a lower surface of the battery case, there is no other way than to raise the vehicle body floor to a position at which an interference with the upwardly-protruding high-power cut-off switch is avoided. As a consequence, when the battery pack disclosed in the Patent Document 1 is arranged in the lower position of the vehicle body floor, a vehicle body floor surface is high, and a vehicle body floor upper space such as a vehicle interior space and a luggage boot space gets narrow. Such problem therefore arises in this case.

On the other hand, in the case of the battery pack structure disclosed in the Patent Document 2, such problem that the vehicle body floor upper space gets narrow due to the mounting of the high-power cut-off switch can be solved. However, since the high-power cut-off switch is provided with the high-power cut-off switch arranged parallel to the battery module in the vehicle width direction, in a case where a maximum width size of the battery case is previously determined, there is no other way than to narrow an area width size that is set as the battery module mounting area. As a consequence, there arises a problem of decreasing or narrowing a battery mounting space where the battery module can be mounted inside the battery case.

CITATION LIST

Patent Document

Patent Document 1: Japanese Patent Provisional Publication Tokkai No. 7-156826
Patent Document 2: Japanese Patent Provisional Publication Tokkai No. 2006-240502

SUMMARY OF THE INVENTION

An object of the present invention is to provide a battery pack structure for the electric vehicle which is capable of securing both of the vehicle body floor upper space and the battery mounting space, in a setting of the mounting position of the high-power cut-off switch to the battery pack case.

As the battery pack structure for the electric vehicle, of the present invention, the electric vehicle mounts, in a lower position of a vehicle body floor, a battery pack case having a battery module and a high-power cut-off switch that cuts off a battery high-power circuit by a manual operation, the battery pack structure comprises: two vehicle front and rear direction areas formed by dividing an inside space of the battery pack case into two areas in a vehicle front-and-rear direction, one of the two areas being defined as a battery module mounting area, and the high-power cut-off switch is provided in an upper surface position of the case that covers the other area that is located on a vehicle front side or a vehicle rear side with respect to the battery module mounting area.

The high-power cut-off switch is provided in the upper surface position of the battery pack case that covers the other area located on the vehicle front side or the vehicle rear side with respect to the battery module mounting area where the battery module is mounted.

Thus, when determining a switch setting portion case height of a portion where the high-power cut-off switch is provided at the battery pack case, the switch setting portion case height can be determined freely, completely without being affected by a height of the battery module. For instance, when a case maximum height of the battery pack case is determined on the basis of a necessary ground clearance of the battery pack case and a height of the vehicle body floor, it is possible to set the switch setting portion case height to be equal to or lower than the case maximum height. In this manner, since no design change that changes the height of the vehicle body floor to a higher position is required, a desired vehicle body floor upper space (such as the vehicle interior space and the luggage boot space) is secured.

On the other hand, in the battery pack case, when determining the battery module mounting area where the battery module is mounted, a width size of the battery module mounting area can be set, completely without being affected by the presence of the high-power cut-off switch. For instance, when a battery module mountable maximum mounting distance in the vehicle width direction is determined, the battery module mounting area can be set to the battery module mounting area having the width size of the maximum mounting distance. In this manner, since there is no need to set the battery module mounting area by subtracting a distance required to provide the high-power cut-off switch from the maximum mounting distance, the greatest possible battery mounting space is secured.

Consequently, in a switch mounting position setting in which the high-power cut-off switch is mounted at the battery pack case, it is possible to secure both of the vehicle body floor upper space and the battery mounting space.

DESCRIPTION OF EMBODIMENTS

In the following description, a battery pack structure for an electric vehicle of the present invention will be explained on the basis of the embodiments shown in the drawings.

Embodiments

Configuration and structure of the battery pack for the electric vehicle of the present embodiment will be explained separately according to [Vehicle mounting configuration of battery pack BP], [Pack components of battery pack BP], [Area dividing configuration of case inside space of battery pack BP] and [Configuration and structure of SD switch].

[Vehicle Mounting Configuration of Battery Pack BP]

Figure 1:
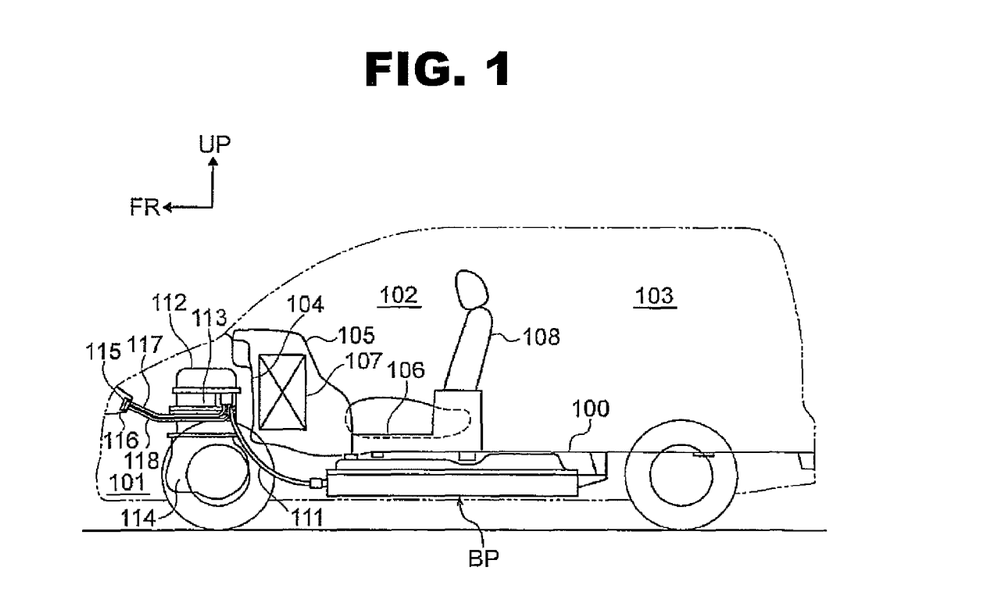
FIG. 1 is a schematic side view of a one-box type electric vehicle that mounts therein a battery pack BP employing a structure of the present embodiment.
Figure 2:
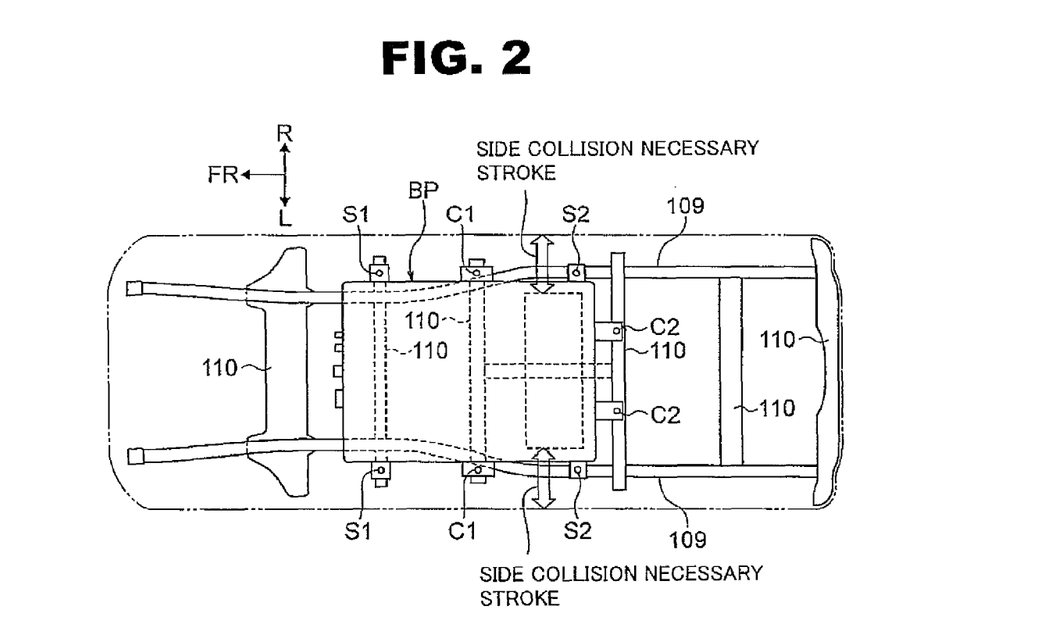
FIG. 2 is a schematic bottom view of the one-box type electric vehicle that mounts therein the battery pack BP employing the structure of the present embodiment.

FIGS. 1 and 2 are a schematic side view and a schematic bottom view of a one-box type electric vehicle that mounts therein the battery pack BP employing a structure of the present embodiment. In the following description, the vehicle mounting configuration of the battery pack BP will be explained with reference to FIGS. 1 and 2.

As shown in FIG. 1, the battery pack BP is arranged in a middle position of a wheel base under a vehicle body floor 100. The vehicle body floor 100 is provided from a connecting position with a dash panel 104 that defines a boundary between a motor room 101 and a vehicle interior 102 up to a vehicle rear end position that secures a luggage room (or a luggage boot) 103 communicating with the vehicle interior 102. The vehicle body floor 100 has a flat shape that suppresses unevenness or asperity on a floor surface from a vehicle front side to a vehicle rear side.

The vehicle interior 102 is provided with an instrument panel 105, a center console box 106, an air conditioning unit 107 and a passenger seat 108.

As shown in FIG. 2, the battery pack BP is supported by a vehicle body member that is a vehicle body strength member at eight supporting points. The vehicle body member is formed by a pair of side members 109, 109 each of which extends in a vehicle front-and-rear direction and a plurality of cross members 110, 110, . . . which connect the pair of side members 109, 109 in a vehicle width direction. Both sides of the battery pack BP are supported at six supporting points by a pair of first side member supporting points S1, S1, a pair of first cross member supporting points C1, C1 and a pair of second side member supporting points S2, S2. A rear side of the battery pack BP is supported at two supporting points by a pair of second cross member supporting points C2, C2.

As shown in FIG. 1, the battery pack BP is connected to a high-power module 112 (a DC/DC converter+a battery charger) disposed in the motor room 101 through a charge/discharge harness 111 that leads linearly in the vehicle front-and-rear direction along the dash panel 104. Besides the high-power module 112, this motor room 101 is provided with an inverter 113 and a motor drive unit 114 (a travelling motor+a speed reduction gear+a differential gear). Further, a quick charge port 115 and a normal charge port 116, having a charge port lid, are provided in a vehicle front face position. The quick charge port 115 and the high-power module 112 are connected through a quick charge harness 117, while the normal charge port 116 and the high-power module 112 are connected through a normal charge harness 118.

The battery pack BP is connected to an air conditioning system that has the air conditioning unit 107 disposed in the instrument panel 105. That is, an inside temperature of the battery pack BP in which after-mentioned battery modules are mounted is controlled by a temperature regulation air (a cold air (or a cool air), a warm air). Here, the cold air is produced by introducing a refrigerant into an evaporator from the air conditioning system through a branched refrigerant pipe. The warm air is produced by operating a PTC heater through a PTC harness from the air conditioning system.

The battery pack BP is connected to an external electronic control system through a bidirectional communication line (not shown) such as a CAN cable. That is, by an integrated control based on information exchange with the external electronic control system, a discharge control (a power running control) and a charge control (a quick charge control, a normal charge control, a regenerative control) etc. of the battery module of the battery pack BP are carried out.

[Pack Components of Battery Pack BP]

FIGS. 3 to 6 are drawings that show a detail of the battery pack BP of the embodiment. In the following description, pack components of the battery pack BP will be explained with reference to FIGS. 3 to 6.

Figure 3:
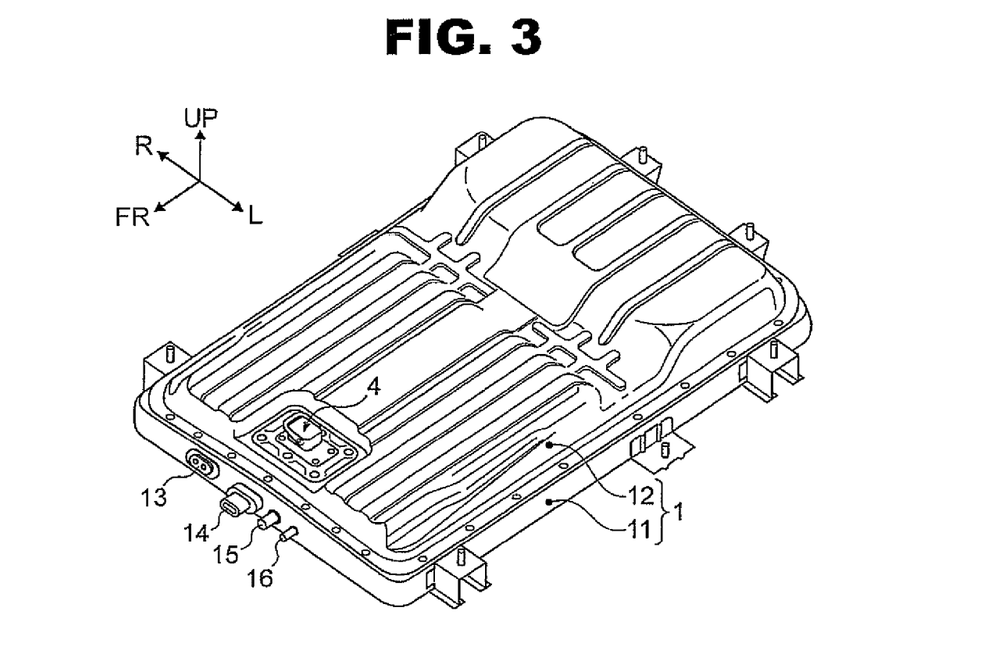
FIG. 3 is a general perspective view of the battery pack BP of the present embodiment.
Figure 4:
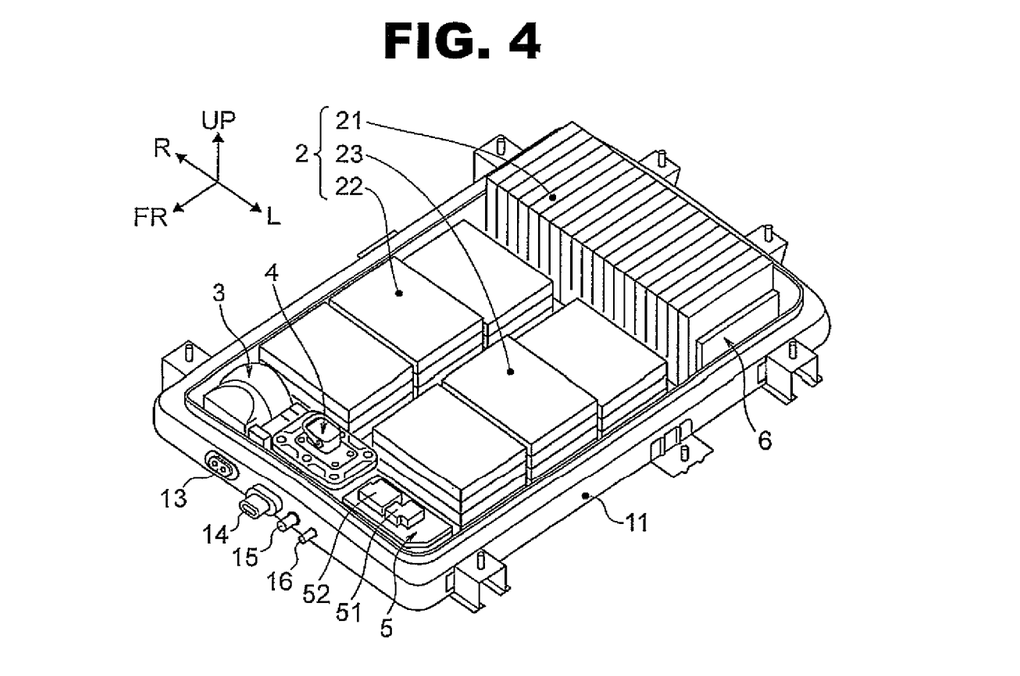
FIG. 4 is a perspective view of the battery pack BP of the present embodiment with a battery case upper cover removed.

As shown in FIGS. 3 and 4, the battery pack BP has a battery pack case 1, a plurality of battery modules 2, a temperature regulation air unit 3, a service disconnect switch 4 (a high-power cut-off switch: hereinafter called "SD switch"), a junction box 5 and a lithium-ion battery controller 6 (hereinafter called "LB controller").

As shown in FIGS. 3 and 4, the battery pack case 1 is formed by two components of a battery pack lower frame 11 and a battery pack upper cover 12.

As shown in FIG. 4, the battery pack lower frame 11 is a frame member that is supported by and fixed to the vehicle body member. This battery pack lower frame 11 has a quadrate recessed mounting space where the battery modules 2 and other pack components 3, 4, 5 and 6 are mounted. A refrigerant pipe connector terminal 13, a charge/discharge connector terminal 14, a high-power connector terminal 15

(for vehicle interior air conditioning) and a low-power connector terminal 16 are fixed to a flame front edge of the battery pack lower frame 11.

As shown in FIG. 3, the battery pack upper cover 12 is a cover member that is fixed to an outer periphery position of the battery pack lower frame 11 with a bolt (s). This battery pack upper cover 12 has a cover surface having uneven stepped surface shape that corresponds to especially an uneven height shape of the battery modules 2 of the pack components 2, 3, 4, 5 and 6 mounted in the battery pack lower frame 11.

Figure 5:
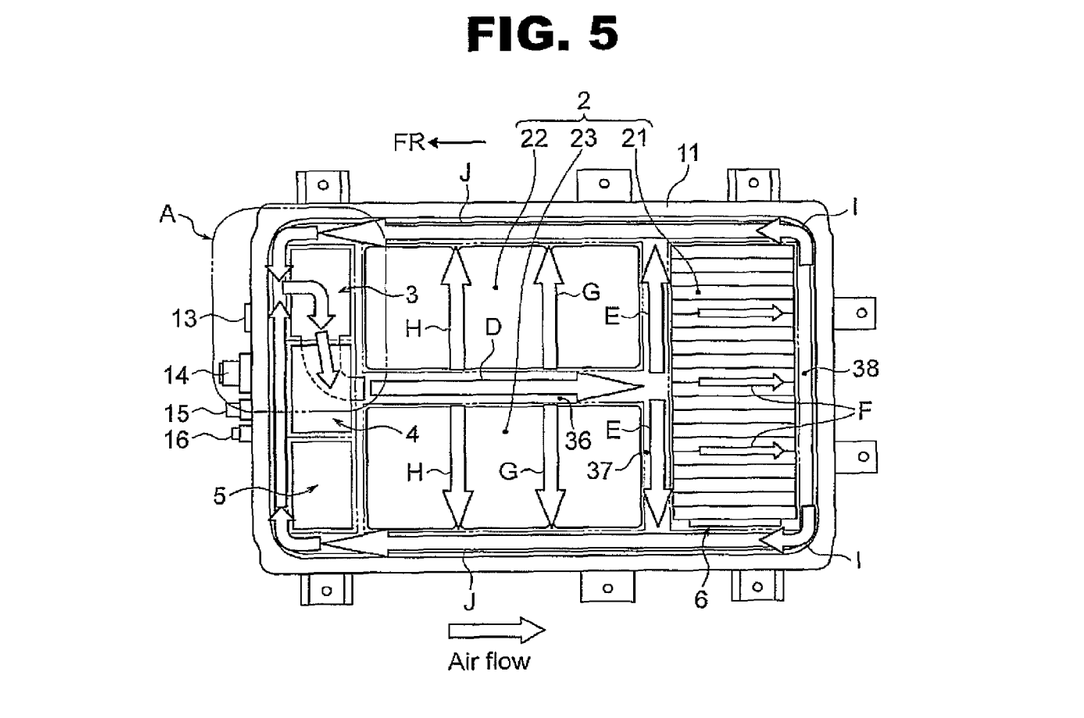
FIG. 5 is a top view of the battery pack BP of the present embodiment with the battery case upper cover removed, which shows an inside configuration of the battery pack BP and flows of a temperature regulation air.

As shown in FIGS. 4 and 5, the battery modules 2 are formed by three separated modules of a first battery module 21, a second battery module 22 and a third battery module 23 which are mounted in the battery pack lower frame 11. Each of the battery modules 21, 22 and 23 is an assembly structure formed by stacking a plurality of battery cells of secondary batteries (lithium-ion batteries etc.). Detailed structure and configuration of each battery module 21, 22 and 23 are as follows.

As shown in FIGS. 4 and 5, the first battery module 21 is mounted at a vehicle rear area in the battery pack lower frame 11. To form this first battery module 21, as a preparation of the formation of the first battery module 21, a plurality of battery cells are stacked in a thickness direction with a rectangular parallelepiped battery cell whose thickness is thin being a unit. Then, by stacking the battery cells in a lateral direction with this stacking direction and the vehicle width direction being the same (e.g. by stacking twenty units in the lateral direction), the first battery module 21 is formed.

As for the second and third battery modules 22 and 23, as shown in FIG. 4, they are separately mounted, as a pair, on right and left sides in the vehicle width direction at a vehicle middle area that is located at a front side with respect to the first battery module 21 in the battery pack lower frame 11. These second and third battery modules 22 and 23 are formed by a vertically-stacked structure by the exactly same pattern. That is, to form the second and third battery modules 22 and 23, as a preparation of the formation of the second and third battery modules 22 and 23, a plurality of battery cells (e.g. four battery cells and five battery cells) are stacked in a thickness direction with a rectangular parallelepiped battery cell whose thickness is thin being a unit, and a plurality of stacked cell sets (e.g. one set of four-stacked cells and two sets of five-stacked cells) are prepared. Then, by arranging the plurality of stacked cell sets, each of which is formed by stacking the battery cells in a vertical direction with this stacking direction and a vehicle up-and-down direction being the same, for instance, by arranging the plurality of stacked cell sets in order of one set of four-vertically-stacked cells, one set of five-vertically-stacked cells and one set of five-vertically-stacked cells from the vehicle rear side toward the vehicle front side, the second and third battery modules 22 and 23 are formed in the vehicle front-and-rear direction.

Figure 6:
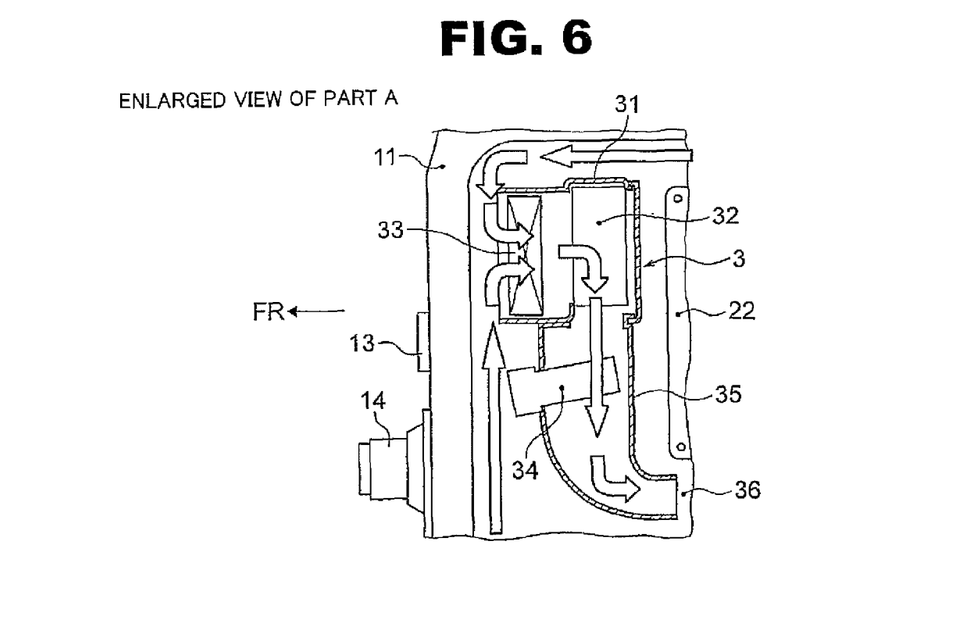
FIG. 6 is an enlarged view of a part A of FIG. 5, which shows a structure of a temperature regulation air unit and the flows of the temperature regulation air in the battery pack BP of the present embodiment.

As shown in FIG. 5, the temperature regulation air unit 3 is placed at a right side area of a vehicle front side space in the battery pack lower frame 11. The temperature regulation air unit 3 flows the temperature regulation air (the cold air, the warm air) into temperature regulation air passages in the battery pack lower frame 11. As shown in FIG. 6, the temperature regulation air unit 3 has a unit case 31, a blow fan 32, an evaporator 33, a PTC heater 34 and a temperature regulation air duct 35. Here, the refrigerant is introduced into the evaporator 33 through the refrigerant pipe connector terminal 13 fixed to the flame front edge.

As shown in FIGS. 3 and 4, the SD switch 4 is placed at a middle area of the vehicle front side space in the battery pack lower frame 11. The SD switch 4 is a switch that mechanically breaks or cuts off a battery high-power circuit (or a battery high-voltage circuit) by a manual operation. The battery high-power circuit is formed by connecting the battery modules 21, 22 and 23, each of which has an inside bus bar, the junction box 5 and the SD switch 4 together through the bus bar. When checking or repairing the high-power module 112 and the inverter 113 etc. or replacing parts of the high-power module 112 and the inverter 113 etc., switch-ON and switch-OFF of the SD switch 4 are switched by the manual operation.

As shown in FIGS. 3 and 4, the junction box 5 is placed at a left side area of the vehicle front side space in the battery pack lower frame 11. The junction box 5 intensively performs supply/cut-off/distribution of the high-power by a relay circuit. This junction box 5 is provided with a temperature regulation relay 51 and a temperature regulation controller 52 which perform a control of the temperature regulation air unit 3. The junction box 5 and the external high-power module 112 are connected through the charge/discharge connector terminal 14 and the charge/discharge harness 111. The junction box 5 and the external electronic control system are connected through a low-power harness.

As shown in FIGS. 4 and 5, the LB controller 6 is placed in a left side end surface position of the first battery module 21. The LB controller 6 performs a capacity control, a temperature control and a voltage control of each of the battery modules 21, 22 and 23. This LB controller 6 gets battery capacity information, battery temperature information and battery voltage information by arithmetic processing based on a temperature detection signal from a temperature detection signal line, a battery voltage detection value from a battery voltage detection line and a battery current detection signal from a battery current detection signal line. The LB controller 6 and the external electronic control system are connected through the low-power harness that transmits ON/OFF information of the relay circuit, the battery capacity information, the battery temperature information, etc.

[Area Dividing Configuration of Case Inside Space of Battery Pack BP]

Figure 7:
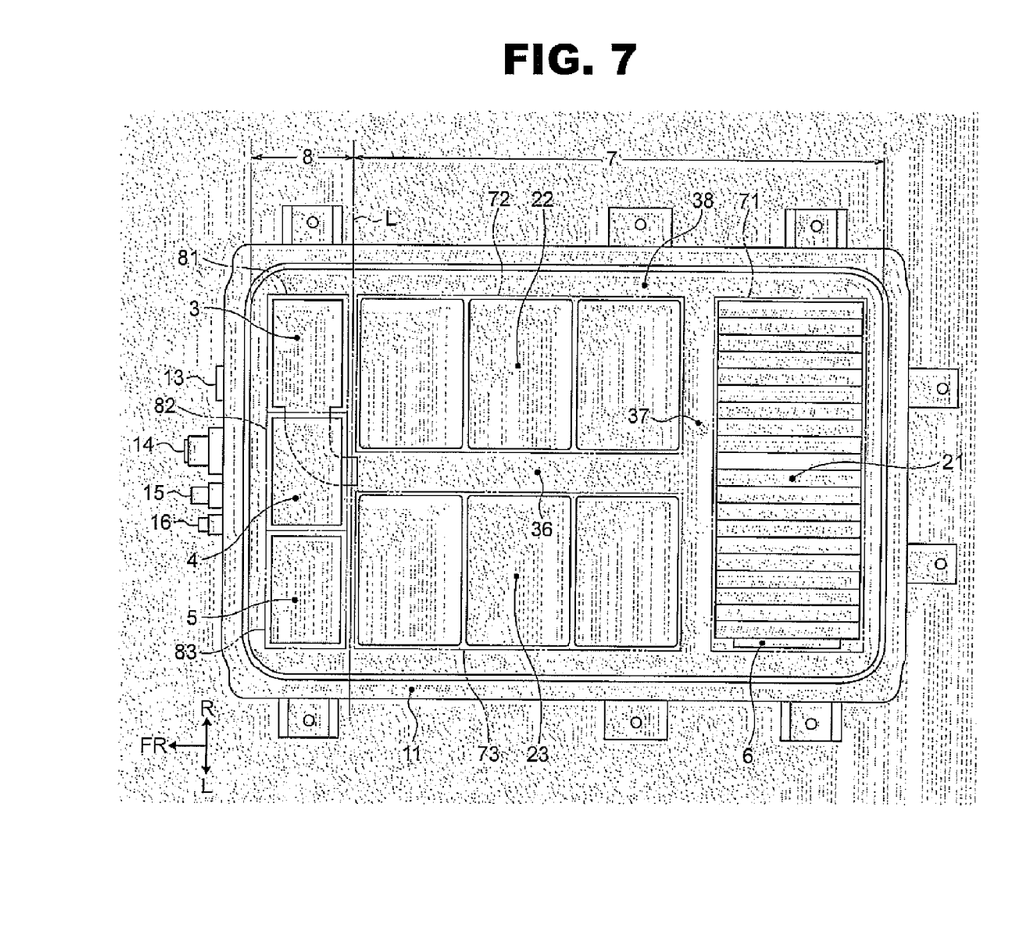
FIG. 7 is a plan view showing an area dividing configuration of a case inside space of the battery pack BP of the present embodiment.

FIG. 7 is a plan view showing an area dividing configuration of a case inside space of the battery pack BP of the present embodiment. In the following description, the area dividing configuration of the case inside space of the battery pack BP will be explained with reference to FIG. 7.

As shown in FIG. 7, the inside space of the battery pack case 1 of the battery pack BP is divided into two vehicle front and rear direction areas of a battery module mounting area 7 located on the vehicle rear side and an electrical component mounting area 8 located on the vehicle front side with a line L that is drawn in the vehicle width direction being a boundary line. The battery module mounting area 7 occupies most of area from a vehicle rear end to the boundary line L on the vehicle front side in the case inside space. The electrical component mounting area 8 occupies an area from a vehicle front end to the boundary line L on the vehicle front side in the case inside space, which is narrower than the battery module mounting area 7.

The battery module mounting area 7 is divided into three divided rectangular areas of a first divided rectangular area 71, a second divided rectangular area 72 and a third divided rectangular area 73 by a T-shaped passage (a center passage 36 and a cross passage 37). The first battery module 21 having on one side surface thereof the LB controller 6 is mounted in the first divided rectangular area 71. The second battery module 22 is mounted in the second divided rectangular area 72. The third battery module 23 is mounted in the third divided rectangular area 73.

The electrical component mounting area 8 is divided into three divided areas of a first divided area 81, a second divided area 82 and a third divided area 83 which are divided in the vehicle width direction. The temperature regulation air unit 3 is mounted in an area from the first divided area 81 to a lower portion of the second divided area 82. The SD switch 4 is mounted or installed at an upper portion of the second divided area 82. The junction box 5 is mounted in the third divided area 83.

In the inside space of the battery pack BP, the temperature regulation air passages to secure internal circulation of the temperature regulation air produced by the temperature regulation air unit 3 are formed by utilizing gaps and clearances created when the battery modules 21, 22 and 23 are mounted in the respective divided rectangular areas. As the temperature regulation air passages, the center passage 36 into which the temperature regulation air blowing from the temperature regulation air unit 3 flows first, the cross passage 37 which splits the air flow flowing from the center passage 36 into both sides in the vehicle width direction and an annular passage 38 which returns an incoming temperature regulation air that flows into an outer circumference of the inside space to the temperature regulation air unit 3, are provided.

The center passage 36 is formed by creating a gap between opposing surfaces of the second and third battery modules 22 and 23. The cross passage 37 is formed by creating a gap between opposing surfaces of the first battery module 21 and the second and third battery modules 22 and 23. The annular passage 38 is formed by creating clearances between the battery pack lower frame 11 and each of the pack components 2, 3, 4, 5 and 6.

Further, as the temperature regulation air passages, not only the center passage 36 that is a passage where the temperature regulation air mainly flows, the cross passage 37 and the annular passage 38, but gaps, clearances and spaces which are formed by the fact that the pack components 2, 3, 4, 5 and 6 are mounted in the case inside space are also included. For instance, regarding the first battery module 21, each gap of stack of the battery cells that are the components of the battery module becomes a temperature regulation air passage with a direction of the gap being the same direction as a flow direction of the temperature regulation air. With regard to the second and third battery modules 22 and 23, a mount clearance between the four-vertically-stacked battery cell set and the five-vertically-stacked battery cell set and also a mount clearance between the five-vertically-stacked battery cell set and the five-vertically-stacked battery cell set become temperature regulation air passages.

As for the electrical component mounting area 8, each space created between an inner surface of the battery pack upper cover 12 and the components of the temperature regulation air unit 3 and the junction box 5 becomes a temperature regulation air passage.

[Configuration and Structure of SD Switch]

FIGS. 8 to 11 are drawings showing a detail of the SD switch mounted in the battery pack BP of the present embodiment. In the following description, configuration and structure of the SD switch will be explained with reference to FIGS. 8 to 11.

Figure 8:
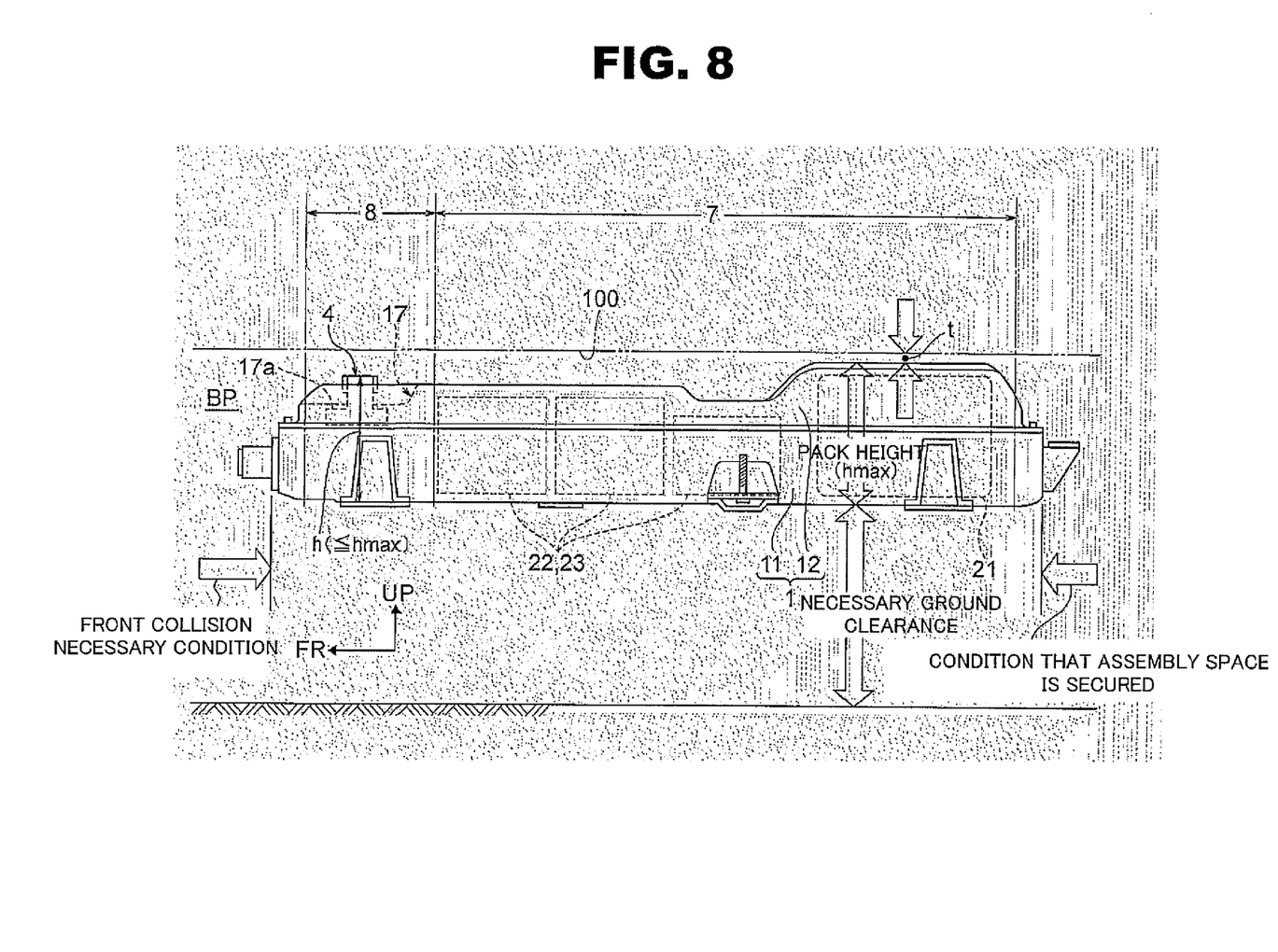
FIG. 8 is a general side view of the battery pack BP, which shows an SD switch mounted in the battery pack BP of the present embodiment.

Regarding the battery pack structure of the embodiment, as a premise, the battery pack case 1 mounting the battery modules 2 and the SD switch 4 mechanically breaking the battery high-power circuit by the manual operation is arranged in the lower position of the vehicle body floor 100. As shown in FIG. 8, also as described above, the inside space of the battery pack case 1 is divided into two areas in the vehicle front-and-rear direction. The vehicle rear direction area (one area) of the two areas is set as the battery module mounting area 7. Then, the SD switch 4 is provided in an upper surface position of the case that covers the electrical component mounting area 8 (the other area) that is set on the vehicle front side with respect to the battery module mounting area 7 in the inside space of the battery pack case 1.

Figure 9:
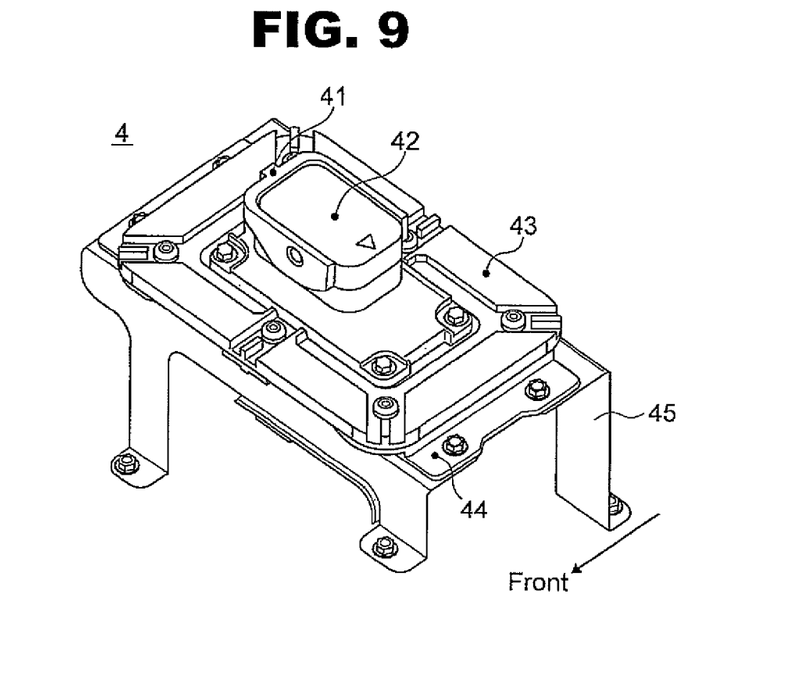
FIG. 9 is a perspective view showing a detailed structure of the SD switch mounted in the battery pack BP of the present embodiment.

As shown in FIG. 9, the SD switch 4 has a switch operating portion 41, a switch body 42, an outer clamping frame 43, an inner clamping frame 44 and a frame fixing bracket 45. The switch operating portion 41 is formed by a lever that turns or rotates on an axis of the vehicle front-and-rear direction from a switch-ON position to a switch-OFF position. The switch body 42 has therein a switch contact that breaks or cuts off the battery high-power circuit by the lever operation. The switch body 42 is provided, at an outer peripheral surface thereof, a flange that is fixed to the inner clamping frame 44. The outer clamping frame 43 is fixed to the inner clamping frame 44 with the battery pack upper cover 12 sandwiched between the outer clamping frame 43 and the inner clamping frame 44. The frame fixing bracket 45 has a four-leg structure, and secures the inner clamping frame 44 to the battery pack lower frame 11.

Figure 10:
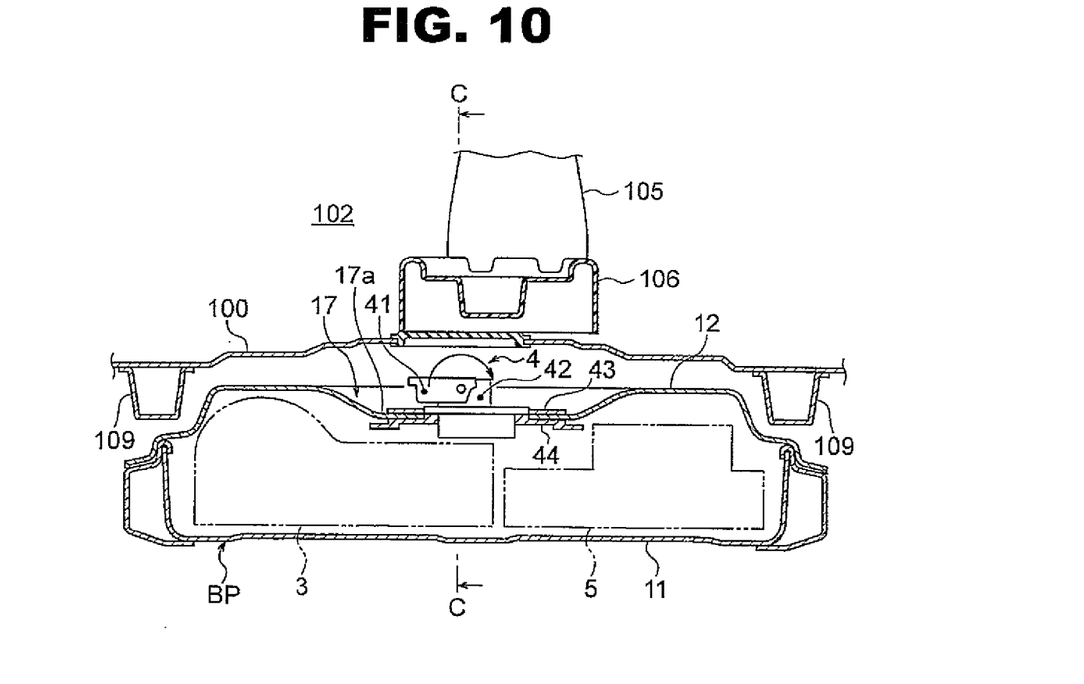
FIG. 10 is a cross section vertically cut along a B-B line of FIG. 11, which shows the SD switch mounted in the battery pack BP of the present embodiment and its surrounding configuration.
Figure 11:
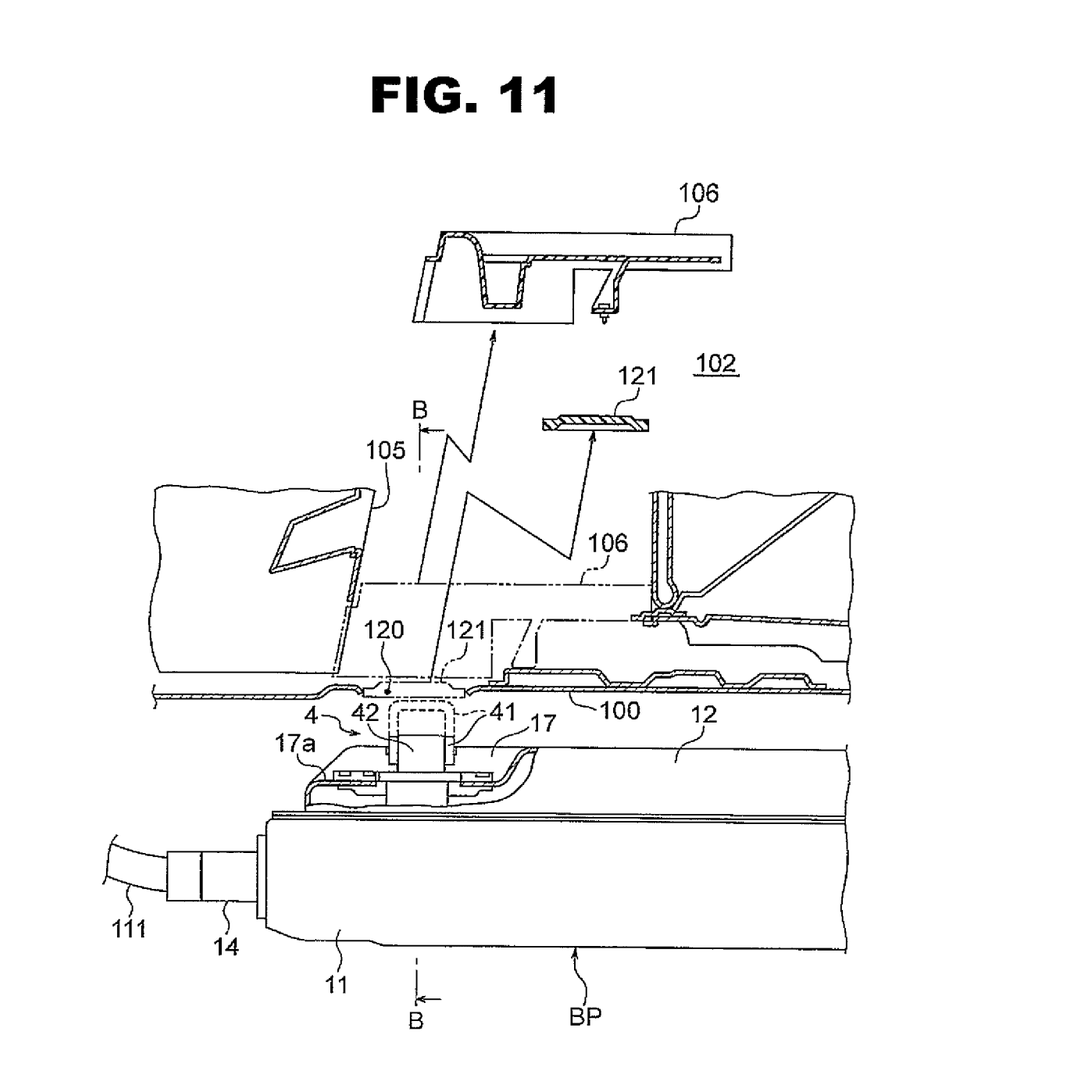
FIG. 11 is a cross section vertically cut along a C-C line of FIG. 10, which shows the SD switch mounted in the battery pack BP of the present embodiment and its surrounding configuration.

As shown in FIGS. 10 and 11, the battery pack upper cover 12 of the battery pack case 1 is provided, on a vehicle front side thereof, a stepped recess (or a stepped concave portion) 17 having a case stepped surface 17*a* that is recessed downwards from the case upper surface in a vehicle width direction middle area of the battery pack upper cover 12. Then, the SD switch 4 is provided at the stepped recess 17.

The SD switch 4 is disposed with the switch operating portion 41 exposed to an outside of the case from the stepped recess 17. Also the SD switch 4 is disposed with a part of the switch body 42 embedded in the case inside from the stepped recess 17.

Configuration of a switch operation to operate the SD switch 4 from the vehicle interior 102 will be explained.

As shown in FIGS. 10 and 11, in an inside of the vehicle interior 102 located above the vehicle body floor 100, the instrument panel 105 is disposed in a vehicle interior front position, and the center console box 106 is disposed in a middle position of the vehicle body floor 100 with the center console box 106 extending from the instrument panel 105 in the vehicle front-and-rear direction. The center console box 106 is provided so that the center console box 106 is detachable from the inside of the vehicle interior 102.

As shown in FIGS. 10 and 11, in an outside of the vehicle interior 102 below the vehicle body floor 100, the SD switch 4 is installed in a position included in a projection area that is obtained by projecting, onto a vehicle lower side, an area as it is covered by the center console box 106.

As shown in FIGS. 10 and 11, the vehicle body floor 100 is provided, in a position corresponding to an upper side of the switch operating portion 41 of the SD switch 4, with a lever operation opening 120 to secure a lever operation space. The lever operation opening 120 is closed by a lid 121. This lid 121 is provided so that the lid 121 is detachable from the inside of the vehicle interior 102.

Next, operation, working and process in the battery pack structure for the electric vehicle of the present embodiment will be explained separately according to [Charge/discharge operation of battery pack BP], [Inside temperature control operation of battery pack BP], [SD switch mounting position setting process] and [Checking/repairing process by battery high-power circuit cut-off].

[Charge/Discharge Operation of Battery Pack BP]

The battery pack BP mounting therein the secondary battery such as the lithium-ion battery corresponds to a fuel tank for an engine vehicle. In the battery pack BP, "charge" by which a battery capacity increases and "discharge" by which the battery capacity decreases are repeated. In the following description, the charge/discharge operation of the battery pack BP will be explained.

When performing a quick charge after stopping at a quick charge stand, the charge port lid provided in the vehicle front face position is opened, and a quick charge connector on a stand side is inserted into the quick charge port 115 on the vehicle side. By performing this quick charge operation, a DC quick charge voltage is supplied to the DC/DC converter of the high-power module 112 through the quick charge harness 117, and this becomes a DC charge voltage by a voltage conversion by the DC/DC converter. This DC charge voltage is then supplied to the battery pack BP through the charge/discharge harness 111, and is charged in the battery cell of each of the battery modules 21, 22 and 23 through the junction box 5 and the bus bars in the battery pack BP.

When performing a normal charge after parking at home, the charge port lid provided in the vehicle front face position is opened, and a normal charge connector on a home power supply side is inserted into the normal charge port 116 on the vehicle side. By performing this normal charge operation, an AC normal charge voltage is supplied to the battery charger of the high-power module 112 through the normal charge harness 118, and this becomes a DC charge voltage by a voltage conversion and an AC/DC conversion in the battery charger. This DC charge voltage is then supplied to the battery pack BP through the charge/discharge harness 111, and is charged in the battery cell of each of the battery modules 21, 22 and 23 through the junction box 5 and the bus bars in the battery pack BP.

Upon performing motor power running by which the vehicle travels by a motor driving force, a DC battery voltage of each of the battery modules 21, 22 and 23 is discharged from the battery pack BP through the bus bars and the junction box 5. This discharged DC battery voltage is supplied to the DC/DC converter of the high-power module 112 through the charge/discharge harness 111, then this becomes a DC drive voltage by the voltage conversion by the DC/DC converter. This DC drive voltage further becomes an AC drive voltage by a DC/AC conversion by the inverter 113. This AC drive voltage is applied to the travelling motor of the motor drive unit 114, and drives a rotation of the travelling motor.

Upon performing motor regenerative braking by which the travelling motor is used as a generator during issuance of a deceleration demand, the travelling motor performs a generator function, and a rotation energy inputted from a driving wheel is converted into a power generation energy. An AC power generation voltage produced by this power generation energy becomes a DC power generation voltage by an AC/DC conversion by the inverter 113. This DC power generation voltage further becomes a DC charge voltage by the voltage conversion by the DC/DC converter of the high-power module 112. This DC charge voltage is supplied to the battery pack BP through the charge/discharge harness 111, and is charged in the battery cell of each of the battery modules 21, 22 and 23 through the junction box 5 and the bus bars in the battery pack BP.

[Inside Temperature Control Operation of Battery Pack BP]

The battery has great dependence on a temperature, and there arises a difference in a battery performance depending on whether a battery temperature is high or low. Because of this, in order to keep a high battery performance, control of the inside temperature (=the battery temperature) of the battery pack BP is necessary. In the following description, the inside temperature control operation of the battery pack BP, to reflect this control, will be explained with reference to FIGS. 5 and 6.

First, a temperature regulation control operation of the battery pack BP executed by the temperature regulation controller 52 will be described. For instance, when the inside temperature of the battery pack BP becomes higher than a first setting temperature by being affected by continuation of a battery charge/discharge load or a high outside air temperature, the refrigerant is introduced into the evaporator 33 of the temperature regulation air unit 3, and the blow fan 32 is rotated. With this operation, heat is taken away from an air flow that passes through the evaporator 33, the cold air is thus produced.

By circulating this cold air in the case inside space where the first battery module 21, the second battery module 22 and the third battery module 23 are mounted, the inside temperature (=the battery temperature) of the battery pack BP lowers.

In contrast to this, for instance, when the inside temperature of the battery pack BP becomes lower than a second setting temperature by being affected by the cold air circulation or a low outside air temperature, the power is applied to the PTC heater 34 of the temperature regulation air unit 3, and the blow fan 32 is rotated. With this operation, heat is given to an air flow that passes through the PTC heater 34, the warm air is thus produced.

By circulating this warm air in the case inside space where the first battery module 21, the second battery module 22 and the third battery module 23 are mounted, the inside temperature (=the battery temperature) of the battery pack BP rises.

By performing the temperature regulation control of the battery pack BP in this manner, it is possible to keep the inside temperature of the battery pack BP within a range from the first setting temperature to the second setting temperature in which the high battery performance can be obtained. At this time, it is important to circulate the temperature regulation air evenly and smoothly throughout the case inside space so as not to create a space where a quantity of the circulated temperature regulation air is insufficient.

The reason is because the inside temperature control of the battery pack BP is aimed at keeping each temperature of the first battery module 21, the second battery module 22 and the third battery module 23 mounted in the case inside space within a battery temperature region (a battery temperature range) in which the high battery performance can be obtained.

In the following description, working of the case inside space circulation of the temperature regulation air will be explained.

As shown by an arrow D in FIG. 5, the temperature regulation air (the cold air, the warm air) flowing out from an outlet of the temperature regulation air unit 3 flows first in the center passage 36 from the vehicle front side toward the vehicle rear side. And as shown by arrows E, E in FIG.

5, the air flow from the center passage 36 is split into both sides in the vehicle width direction by the cross passage 37 that crosses the center passage 36. That is, the T-shaped passage formed by the center passage 36 and the cross passage 37 is a main passage where the temperature regulation air flows. The temperature regulation air flowing in the T-shaped passage branches off in multiple directions at some points of the air flow. Then, heat exchange with each of the first battery module 21, the second battery module 22 and the third battery module 23 is done as follows.

The heat exchange of the first battery module 21 is mainly done between the first battery module 21 and the temperature regulation air separately flowing in the cross passage 37 toward both sides in the vehicle width direction as shown by the arrows E, E in FIG. 5, also between the first battery module 21 and the temperature regulation air flowing in the gap of the cell stack from the vehicle front side toward the vehicle rear side as shown by arrows F in FIG. 5.

Each heat exchange of the second battery module 22 and the third battery module 23 is done between each of the battery modules 22, 23 and the temperature regulation air flowing in the center passage 36 from the vehicle front side toward the vehicle rear side as shown by the arrow D in FIG. 5, also between each of the battery modules 22, 23 and the temperature regulation air separately flowing in the cross passage 37 toward both sides in the vehicle width direction as shown by the arrows E, E in FIG. 5. In addition to this, the heat exchange is done between each of the battery modules 22, 23 and the temperature regulation air separately flowing in the mount clearance between the four-vertically-stacked battery cell set and the five-vertically-stacked battery cell set toward both sides in the vehicle width direction as shown by arrows G, G in FIG. 5. Furthermore, the heat exchange is done between each of the battery modules 22, 23 and the temperature regulation air separately flowing in the mount clearance between the five-vertically-stacked battery cell set and the five-vertically-stacked battery cell set toward both sides in the vehicle width direction as shown by arrows H, H in FIG. 5.

The air flow having exchanged the heat with the first battery module 21, the second battery module 22 and the third battery module 23 as described above flows into the annular passage 38 formed at the outer circumference of the inside space. As shown by arrows I, I in FIG. 5, the air flow after the heat exchange (also called post-heat exchange air flow) flowing into the annular passage 38 is split into both sides in the vehicle width direction in a vehicle rear side passage part that extends along the first battery module 21. Then, as shown by arrows J, J in FIG. 5, the two split air flows after the heat exchange each flow from the vehicle rear side toward the vehicle front side in vehicle both side passage parts. Afterwards, these two split air flows meet each other in a vehicle front side passage part, and are returned to an inlet side of the temperature regulation air unit 3.

Next, working, in the temperature regulation air unit 3, of the creation of the cold air or the warm air from the post-heat exchange air flow returned to the unit inlet side will be explained.

As shown by arrows in FIG. 6, the post-heat exchange air flow returned to the unit inlet side passes through the evaporator 33 and the blow fan 32 in the unit case 31, and passes through the PTC heater 34 provided in the temperature regulation air duct 35, then flows out from the duct outlet to the center passage 36. At this time, when the refrigerant is introduced into the evaporator 33 and the blow fan 32 is rotated with the power application to the PTC heater 34 stopped, the heat is taken away from the post-heat exchange air flow by the evaporator 33, then the cold air is produced. On the other hand, when the power is applied to the PTC heater 34 and the blow fan 32 is rotated with the introduction of the refrigerant into the evaporator 33 stopped, the heat is given from the PTC heater 34 to the post-heat exchange air flow that passes through the PTC heater 34, then the warm air is produced.

The present embodiment employs the above configuration or structure in which the center passage 36, the cross passage 37 and the annular passage 38 are formed in the case inside space and the temperature regulation air unit 3 is disposed in a position where the incoming post-heat exchange air flows flowing from two routes, which meet each other, are drawn and the produced temperature regulation air flows out in the center passage 36.

With this configuration or structure, upon controlling the inside temperature of the battery pack BP by the temperature regulation air (the cold air, the warm air), the temperature regulation air circulates evenly and smoothly throughout the case inside space so as not to create the space where the quantity of the circulated temperature regulation air is insufficient.

As explained above, in the temperature regulation air control of the battery pack BP, since control accuracy and control response are increased, it is possible to suppress a variation of the inside temperature of the battery pack BP to within a narrow range. In other words, it is possible to keep the inside temperature of the battery pack BP within an optimum temperature region (an optimum temperature range) in which the high battery performance can be obtained as intended.

[SD Switch Mounting Position Setting Process]

In a case where the battery pack BP mounting the SD switch 4 is arranged in the lower position of the vehicle body floor 100, it is necessary that requirement conditions for the position setting of an upper surface, a lower surface, both side surfaces, a front surface and a rear surface of the battery pack BP should be satisfied. In the following description, an SD switch mounting position setting process, to reflect this satisfaction of the conditions, will be explained.

First, a position setting requirement condition of the battery pack BP arranged in the lower position of the vehicle body floor 100 is as follows.

Upper Surface Position Requirement Condition

Regarding the upper surface of the battery pack BP, as shown in FIG. 8, to prevent an interference with the vehicle body floor 100, it is necessary to satisfy a condition that the upper surface of the battery pack BP is separate from an underside of the vehicle body floor 100 by a predetermined gap t.

Lower Surface Position Requirement Condition

Regarding the lower surface of the battery pack BP, as shown in FIG. 8, it is necessary to satisfy both of a condition that a predetermined battery pack height from the upper surface of the battery pack BP is secured and a condition that the lower surface of the battery pack BP is separate from a road surface by a necessary ground clearance so as not to interfere with the road surface even when a vehicle attitude changes.

Both Side Surface Position Requirement Condition

Regarding the both side surfaces of the battery pack BP, as shown in FIG. 2, it is necessary to satisfy a condition that, as a clearance from a sill outer of the vehicle body to the battery module in the battery pack BP, a clearance of a side collision necessary stroke (i.e. a clearance required to prevent damage to the battery module by a collision from a lateral side) or greater is secured on both sides.

Front Surface Position Requirement Condition

Regarding the front surface of the battery pack BP, as shown in FIG. 8, it is necessary to satisfy a front collision necessary condition (a requirement that the front surface of the battery pack BP is not damaged by a collision from a front side).

Rear Surface Position Requirement Condition

Regarding the rear surface of the battery pack BP, as shown in FIG. 8, it is necessary to satisfy a condition that an assembly space of a rear suspension is secured.

In the case where the battery pack BP mounting the SD switch 4 is arranged in the lower position of the vehicle body floor 100 as described above, the following can be said about the front surface position setting requirement condition and the rear surface position setting requirement condition.

The front surface position setting requirement condition is not strict as compared with the other conditions, and degree of freedom of the front surface position setting of the battery pack BP is high. Thus, when determining the battery pack BP position in the vehicle front-and-rear direction, a dimension from a rear wheel center axis up to the rear surface of the battery pack BP is set to a dimension that satisfies the rear surface position setting requirement condition. Then, in a case where the same battery pack BP is mounted in a vehicle whose wheel base length is different, the dimension from the rear wheel center axis up to the rear surface of the battery pack BP is set the same (namely that the dimension from the rear wheel center axis up to the rear surface of the battery pack BP is set so as to coincide with the above dimension satisfying the rear surface position setting requirement condition). In this setting manner, the positioning of the battery pack BP in the vehicle front-and-rear direction for each vehicle having the different wheel base length is not required, and both of the front surface position setting requirement condition and the rear surface position setting requirement condition of the battery pack BP can be satisfied.

In the case where the battery pack BP mounting the SD switch 4 is arranged in the lower position of the vehicle body floor 100 as described above, especially the upper surface position setting requirement condition and the lower surface position setting requirement condition of the position setting requirement conditions are strict, and it is required that both these conditions should be satisfied.

With regard to these conditions, the SD switch 4 is provided in the upper surface position of the case covering the electrical component mounting area 8 that is set on the vehicle front side with respect to the battery module mounting area 7 where the battery modules 2 are mounted. That is, as a positioning configuration of the SD switch 4, by providing the SD switch 4 with the SD switch 4 deviating from the battery module mounting area 7 in the vehicle front-and-rear direction, the position of the SD switch 4 can be set by utilizing the electrical component mounting area 8 whose degree of freedom of space is high.

Accordingly, when determining a switch setting portion case height h of a portion where the SD switch 4 is provided at the battery pack case 1, the height can be determined freely as long as the height is equal to or higher than a height of the SD switch 4, completely without being affected by heights of the battery modules 2.

For instance, the necessary ground clearance from the road surface up to the lower surface of the battery pack BP is previously determined at a vehicle design stage including the suspension. Likewise, in a case where a height position of the vehicle body floor 100 to secure desired vehicle interior space and luggage boot space is previously determined, a position that is separate from the underside position of the vehicle body floor 100 by the predetermined gap t is determined as the upper surface position of the battery pack BP. Therefore, a case maximum height hmax is determined from a difference between the upper surface position and the lower surface position of the battery pack BP.

When the case maximum height hmax of the battery pack case 1 is determined in this manner, the switch setting portion case height h of the portion where the SD switch 4 is provided is determined so that the switch setting portion case height h is equal to or lower than the case maximum height hmax. In this setting manner, a desired vehicle body floor upper space (such as the vehicle interior space and the luggage boot space) is secured without requiring a design change that moves or shifts the height position of the vehicle body floor 100 from the previously determined position toward a vehicle body upper side.

On the other hand, in the battery pack case 1, when determining the battery module mounting area 7 where the battery modules 2 are mounted, the battery module mounting area 7 can be set to an allowable width size against a case width without being affected by the presence of the SD switch 4.

For instance, in a case where a vehicle width direction distance between a pair of side sill outers is previously determined, by subtracting the both side clearances of the side collision necessary stroke from the side sill outer distance, a maximum mounting distance of the battery modules 2 is determined. At this time, there is no need to subtract a distance required to provide the SD switch 4 from the determined maximum mounting distance of the battery modules 2. Thus, by defining the battery module mounting area 7 having a width size of the maximum mounting distance of the battery modules 2, the greatest possible battery mounting space is secured.

Hence, in the switch mounting position setting process in which the SD switch 4 is mounted at the battery pack case 1, it is possible to secure both of the vehicle body floor upper space and the battery mounting space.

The embodiment employs the configuration or structure in which the SD switch 4 is disposed with the switch operating portion 41 exposed to the outside of the battery pack case 1 and with a part of the switch body 42 embedded in the inside of the battery pack case 1.

As described above, by disposing the SD switch 4 with the switch operating portion 41 exposed to the case outside, an operability of the SD switch 4, which means that the switch operation can be performed from the outside, can be ensured. Further, by disposing the SD switch 4 with a part of the switch body 42 embedded in the case inside, the switch contact provided in the switch body 42 can be protected, and the switch setting portion case height h of the portion where the SD switch 4 is provided can be set to be lower by an embedded depth (an embedded size).

The embodiment employs the configuration or structure in which the stepped recess (or the stepped concave portion) 17 having the case stepped surface 17a that is recessed downwards from the case upper surface in one area, in the vehicle width direction, of the case upper surface of the battery pack case 1 is formed and the SD switch 4 is provided in a position of the stepped recess 17.

With this configuration or structure, the height of the SD switch 4 can be set to be lower, namely that the SD switch 4 can be prevented from protruding from the battery pack case 1, by a difference in the height between the case upper surface and the case stepped surface 17a of the battery pack case 1. Also, the case inside space of the electrical component mounting area 8 is secured.

That is, to secure the vehicle body floor upper space as described above, it is required to determine the switch setting portion case height h of the portion where the SD switch 4 is provided so that the switch setting portion case height h is equal to or lower than the case maximum height hmax of the battery pack case 1.

With regard to this requirement, only by setting a dimension of depth of the stepped recess 17 in compliance with the case height requirement without the need for a design change of the SD switch 4, the switch setting portion case height h of the portion where the SD switch 4 is provided can be readily fixed for a height that satisfies the requirement.

Further, if the all area, in the vehicle width direction, of the case upper surface of the battery pack case 1 is recessed, the inside space of the electrical component mounting area 8 gets narrow due to a lower case stepped surface. In contrast to this, since the stepped recess 17 is formed by recessing the one area, in the vehicle width direction, of the case upper surface of the battery pack case 1 and also the case upper surface of the vehicle width direction area except the stepped recess 17 is still positioned high, the case inside space of the electrical component mounting area 8 is secured. In the case of the embodiment, as shown in FIG. 10, the mounting space of the temperature regulation air unit 3 and the mounting space of the junction box 5, including a lower side space of the SD switch 4, are secured.

[Checking/Repairing Process by Battery High-Power Circuit Cut-Off]

When checking or repairing the high-power module 112 and the inverter 113 etc. or replacing the parts of the high-power module 112 and the inverter 113 etc., to ensure safety of the work, it is necessary to mechanically break or cut-off the power application of the battery high-power circuit. In the following description, checking/repairing process by the battery high-power circuit cut-off, to reflect this safety, will be explained with reference to FIGS. 10 and 11.

When checking or repairing the high-power module 112 and the inverter 113 etc. or replacing the parts of the high-power module 112 and the inverter 113 etc., as shown in FIG. 11, firstly, a part of the center console box 106 extending from the instrument panel 105 in the vehicle front-and-rear direction and disposed in the middle position of the vehicle body floor 100 is removed from the vehicle body floor 100 by a removal work from the inside of the vehicle interior 102. Secondly, the lid 121 closing the lever operation opening 120 provided at the vehicle body floor 100 is removed from the vehicle body floor 100 by a removal work from the inside of the vehicle interior 102.

Then, when the removal of the center console box 106 and the lid 121 is finished, the lever operation space is secured at the upper side of the switch operating portion 41 of the SD switch 4. And by inserting hand from the lever operation opening 120 and holding the switch operating portion 41 of the SD switch 4, as shown by an arrow in FIG. 10, the switch operating portion 41 is turned. By this turning operation of the switch operating portion 41, the SD switch 4 is changed from a switch-ON state to a switch-OFF state, then the battery high-power circuit including the battery modules 2 is cut-off.

After cutting-off the battery high-power circuit so that the high-power (the high-current) is not carried by this SD switch operation, the checking or the repairing of the high-power module 112 and the inverter 113 etc. or the replacing of the parts of the high-power module 112 and the inverter 113 etc. is done. Then, during the work, even if the hand touches a bare high-power cable or a bare high-power circuit, the safety of the work can be ensured.

Here, in a case where the work of the checking, the repairing or the replacing is performed with electrical systems of the electric vehicle turned off, the relay circuit in the junction box 5 is electrically off. Therefore, when the relay circuit in the junction box 5 properly works, the high-power cut-off operation by the SD switch 4 is not needed. However, in the case of the relay circuit, there is a possibility that a short circuit will occur in the relay circuit in some rare cases. Thus, to certainly ensure the safety of the work, the mechanical high-power cu off by the SD switch 4 is carried out.

After the work of the checking, the repairing or the replacing is completed, by inserting the hand into the lever operation space secured at the upper side of the switch operating portion 41 of the SD switch 4 from the lever operation opening 120 and holding the switch operating portion 41 of the SD switch 4, the SD switch 4 is changed from the switch-OFF state to the switch-ON state. Subsequently, by fixing the removed lid 121 and a part of the center console box 106 to the vehicle body floor 100, an original state before the work, in which the power can be applied, is recovered with the battery high-power circuit closed.

As explained above, in the embodiment, on the vehicle body floor 100, the lever operation opening 120 is provided in a projection area that is obtained by projecting, onto the vehicle lower side, a floor area as it is covered by the center console box 106 that is removable (or detachable) from the inside of the vehicle interior 102. Then the switch operating portion 41 of the SD switch 4 is set in a position located in the space extending from the lever operation opening 120 toward the vehicle lower side. The embodiment employs such configuration or structure.

With this configuration or structure, by removing a part of the center console box 106 and the lid 121 from the vehicle body floor 100 by the removal work from the inside of the vehicle interior 102, the lever operation space is secured at the upper side of the switch operating portion 41 of the SD switch 4, and the manual operation of the SD switch 4 can be performed as it is from the inside of the vehicle interior 102.

Accordingly, when checking or repairing the high-power module 112 and the inverter 113 etc. or replacing the parts of the high-power module 112 and the inverter 113 etc., a member that covers an area where the SD switch 4 exists is removed from the inside of the vehicle interior 102, thereby easily performing the manual operation of the SD switch 4 as it is from the inside of the vehicle interior 102.

Next, effects of the present invention will be explained.

In view of the foregoing, the battery pack structure for the electric vehicle of the embodiment includes the following configurations and effects.

(1) A battery pack structure for an electric vehicle that mounts, in a lower position of a vehicle body floor 100, a battery pack case 1 having a battery module 2 and a high-power cut-off switch (SD switch 4) that cuts off a battery high-power circuit by a manual operation, the battery pack structure has: two vehicle front and rear direction areas formed by dividing an inside space of the battery pack case 1 into two areas in a vehicle front-and-rear direction, one of the two areas being defined as a battery module mounting area 7, and the high-power cut-off switch (the SD switch 4) is provided in an upper surface position of the case that covers the other area (an electrical component mounting area 8) that is located on a vehicle front side with respect to the battery module mounting area 7.

Thus, in the switch mounting position setting in which the high-power cut-off switch (the SD switch 4) is mounted at the battery pack case 1, it is possible to secure both of the vehicle body floor upper space and the battery mounting space.

(2) The high-power cut-off switch (the SD switch 4) has a switch operating portion 41 and a switch body 42, and the high-power cut-off switch (the SD switch 4) is disposed with the switch operating portion 41 exposed to an outside of the battery pack case 1 and with at least a part of the switch body 42 embedded in an inside of the battery pack case 1.

Therefore, in addition to the effect of (1), the operability of the high-power cut-off switch (the SD switch 4) can be ensured and the switch contact of the high-power cut-off switch (the SD switch 4) can be protected. Further, the switch setting portion case height h of the portion where the SD switch 4 is provided can be set to be lower by the embedded depth (the embedded size).

(3) A stepped recess 17 having a case stepped surface 17*a* that is recessed downwards from the case upper surface is formed in one area in a vehicle width direction on the case upper surface of the battery pack case 1, and the high-power cut-off switch (the SD switch 4) is provided in a position of the stepped recess 17.

Thus, in addition to the effects of (1) and (2), the switch setting portion case height h of the portion where the high-power cut-off switch (the SD switch 4) is provided can be readily fixed for a height that satisfies the requirement. Further, it is possible to secure the case inside space of the area (the electrical component mounting area 8) that is set on the vehicle front side with respect to the battery module mounting area 7.

(4) A lever operation opening 120 is provided in a projection area that is obtained by projecting, onto a vehicle lower side, a floor area as it is covered by a member (a center console box 106) that is removable from the vehicle body floor 100 from an inside of a vehicle interior 102, and the switch operating portion 41 of the high-power cut-off switch (the SD switch 4) is set in a position located in a space extending from the lever operation opening 120 toward the vehicle lower side.

Therefore, in addition to the effect of (3), when checking or repairing a high-power component (the high-power module 112, the inverter 113 etc.) or replacing parts of the high-power component (the high-power module 112, the inverter 113 etc.), a member (the center console box 106) that covers an area where the high-power cut-off switch (the SD switch 4) exists is removed from the inside of the vehicle interior 102, thereby easily performing the manual operation of the high-power cut-off switch (the SD switch 4) as it is from the inside of the vehicle interior 102.

Although the battery pack structure for the electric vehicle has been explained above by reference to a certain embodiment of the invention, the invention is not limited to the embodiment described above.

In the embodiment, as an example, the SD switch 4 is provided in the upper surface position of the case covering the electrical component mounting area 8 that is set on the vehicle front side with respect to the battery module mounting area 7. However, for instance, in a rear wheel drive electric vehicle, the high-power cut-off switch could be provided in an upper surface position of a case covering an area that is set on the vehicle rear side with respect to the battery module mounting area.

In the embodiment, as an example, the area that is set on the vehicle front side with respect to the battery module mounting area 7 is the electrical component mounting area 8 where the temperature regulation air unit 3, the SD switch 4 and the junction box 5 are mounted. However, for instance, an area that is set on the vehicle front side or the vehicle rear side with respect to the battery module mounting area could be an area where components except the temperature regulation air unit and the junction box are mounted, or might be a dedicated switch-mounting area where only the high-power cut-off switch is mounted.

In the embodiment, as an example, a part of the switch body 42 of the SD switch 4 is embedded in the case inside of the battery pack case 1. However, for instance, the whole of the switch body of the high-power cut-off switch could be embedded in the case inside of the battery pack case with only the switch operating portion exposed to the outside of the case.

In the embodiment, as an example, the SD switch 4 is provided at the stepped recess 17. However, for instance, the stepped recess is not formed, and the high-power cut-off switch could be provided in the upper surface position of the battery pack case.

In the embodiment, an example showing that the switch manual operation of the SD switch 4 can be operated from the inside of the vehicle interior with a part of the center console box 105 removed is explained. However, for instance, the switch manual operation of the high-power cut-off switch could be operated from the inside of the vehicle interior with apart of the instrument panel removed or with a lid of a part of the instrument panel opened.

In the embodiment, as an example, the battery pack structure of the present invention is applied to the one-box type electric vehicle that mounts therein only the travelling motor as a travelling drive source. However, as a matter of course, besides the one-box type vehicle, the battery pack structure for the electric vehicle of the present invention can be applied to various electric vehicles such as a sedan, a wagon and an SUV type vehicle. Further, the battery pack structure of the present invention can be applied to a hybrid type electric vehicle (a hybrid electric vehicle) that mounts therein the travelling motor and an engine as the travelling drive source. That is, the battery pack structure of the present invention can be applied to an electric vehicle as long as the electric vehicle is an electric vehicle in which the battery pack is arranged in the lower position of the vehicle body floor.

The invention claimed is:

1. A battery pack structure for an electric vehicle that mounts, at an underside of a vehicle body floor, a battery pack case having a battery module and a high-power cut-off switch that cuts off a battery high-power circuit by a manual operation, the battery pack structure comprising:
   two vehicle areas formed by dividing an inside space of the battery pack case into two areas such that one area is in front of another area in a vehicle front-and-rear direction, the two areas comprising a first area and a second area,
   wherein the first area comprises a battery module mounting area where the battery module is mounted,
   wherein the second area is between the first area and at least one connector terminal,
   wherein the high-power cut-off switch is provided on an upper portion of the battery pack case and in the second area which is located on a vehicle front side or a vehicle rear side with respect to the battery module mounting area, wherein a distance between the underside of the vehicle body floor and a portion of the upper portion of the battery pack case where the high-power cut-off switch is provided is greater than a distance between a portion of an upper surface of the battery pack case and the underside of the vehicle body floor in the first area, and wherein a portion of the high-power cut-off switch is embedded in the battery pack case at a recess including a concave portion sloping downward along the upper portion of the battery pack case.

2. The battery pack structure for the electric vehicle as claimed in claim 1, wherein:

the high-power cut-off switch has a switch operating portion and a switch body, and the high-power cut-off switch is disposed with the switch operating portion exposed to an outside of the battery pack case and with at least a part of the switch body embedded in an inside of the battery pack case.

3. The battery pack structure for the electric vehicle as claimed in claim 1, wherein:

the recess includes a case stepped surface that is recessed from an uppermost surface of the battery pack case and is formed in a vehicle width direction on the upper portion of the battery pack case, and the high-power cut-off switch is provided in a position of the recess.

4. The battery pack structure for the electric vehicle as claimed in claim 3, wherein:

a lever operation opening is provided in a projection area that is obtained by projecting, onto a vehicle lower side, a floor area as it is covered by a member that is removable from the vehicle body floor from an inside of a vehicle interior, and a switch operating portion of the high-power cut-off switch is positioned in a space extending from the lever operation opening toward the vehicle lower side.

5. The battery pack structure for the electric vehicle as claimed in claim 1, wherein:

the high-power cut-off switch is provided in an upper surface position that covers an electrical component mounting area set on the vehicle front side with respect to the battery module mounting area.

6. The battery pack structure for the electric vehicle as claimed in claim 1, wherein:

the distance between the upper surface of the battery pack case and the underside of the vehicle body floor is smallest at a portion of the battery pack case at a distal portion of the first area.

* * * * *